(12) United States Patent
Malik et al.

(10) Patent No.: US 8,508,182 B2
(45) Date of Patent: Aug. 13, 2013

(54) ELECTRICALLY CONNECTING BLOWER TO POWER SUPPLY STAGE PROVIDING HIGHER VOLTAGE

(75) Inventors: Randhir S. Malik, Cary, NC (US); Jen-Ching Lin, Apex, NC (US); Chu Te Chung, Cary, NC (US); Cecil C. Dishman, Raleigh, NC (US); Michael J. Steinmetz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 12/614,719

(22) Filed: Nov. 9, 2009

(65) Prior Publication Data
US 2011/0110806 A1    May 12, 2011

(51) Int. Cl.
*H02P 3/18* (2006.01)

(52) U.S. Cl.
USPC ............... 318/813; 363/15; 363/17; 363/141; 363/142; 363/56.01; 318/3; 318/71; 318/116; 318/268; 318/248; 315/210; 315/211; 315/212; 315/224; 315/291; 219/130.21; 219/130.1; 417/423.7; 417/228; 417/423.11; 417/423.3; 417/423.5

(58) Field of Classification Search
USPC .............. 363/15, 17, 141, 274.3, 142, 50, 363/65, 56.01, 71, 68, 95, 21.02, 21.03; 417/423.7; 318/799, 400.01, 400.02, 400.07, 318/400.04, 400.42, 400.39, 400.38, 400.37, 318/71, 248, 813, 3, 116, 268, 471; 315/247, 315/307, 291, 224, 209 R; 219/130.21, 130.1; 29/888.025
See application file for complete search history.

(56) References Cited

U.S. PATENT DOCUMENTS

| | | | |
|---|---|---|---|
| 4,836,444 A | 6/1989 | Kawamura | |
| 5,197,862 A | 3/1993 | Kladder | |
| 5,612,581 A * | 3/1997 | Kageyama | ...................... 307/64 |
| 5,706,667 A | 1/1998 | Iritani et al. | |
| 6,664,748 B2 | 12/2003 | Kushida et al. | |
| 2003/0128564 A1 * | 7/2003 | Karol et al. | ................... 363/141 |
| 2006/0139823 A1 * | 6/2006 | Shoji et al. | ...................... 361/56 |
| 2007/0069446 A1 | 3/2007 | Lamendola et al. | |
| 2009/0168472 A1 * | 7/2009 | Chung et al. | .................... 363/65 |
| 2010/0109571 A1 * | 5/2010 | Nishino et al. | ................ 315/307 |

* cited by examiner

Primary Examiner — Eduardo Colon Santana
Assistant Examiner — Jorge Carrasquillo
(74) Attorney, Agent, or Firm — Steven L. Bennett

(57) ABSTRACT

An alternating current-to-direct current (AC-to-DC) power supply has a first stage providing a first DC voltage and a second stage providing a second DC voltage. The AC-to-DC power supply has a first efficiency at the first stage and a second efficiency at the second stage that is less than the first efficiency. The second DC voltage is also less than the first DC voltage. A blower is electrically connected to the first stage of the AC-to-DC power supply to receive the first DC voltage from the AC-to-DC power supply to power the blower. Electrical connection of the blower to the first stage of the AC-to-DC power supply instead of to the second stage of the AC-to-DC power supply wastes less power and is more efficient.

18 Claims, 3 Drawing Sheets

ELECTRICALLY CONNECTING BLOWER TO POWER SUPPLY STAGE PROVIDING HIGHER VOLTAGE

FIELD OF THE INVENTION

The present invention relates generally to a system including a blower, and more particularly to electrically connecting the blower to an internal stage of a power supply of the system that provides a higher voltage as compared to a stage of the power supply that provides a lower voltage.

BACKGROUND OF THE INVENTION

Computing devices and computing systems including computing devices typically include a large number of components that generate heat. This heat can be destructive, causing the internal temperatures of the devices and systems to rise to a level in which the components begin to fail. Therefore, such computing devices and computing systems typically include blowers to overcome internal back pressure to externally exhaust the heat, so that the heat does not result in failure of the components of the devices and systems.

SUMMARY OF THE INVENTION

A system of an embodiment of the invention includes an alternating current-to-direct current (AC-to-DC) power supply and a blower. The AC-to-DC power supply has a first stage that provides a first DC voltage and a second stage that provides a second DC voltage. The second DC voltage is much less than the first DC voltage. The blower is electrically connected to the output of the first stage of the AC-to-DC power supply to receive the first DC voltage from the AC-to-DC power supply to power the blower.

A method of an embodiment of the invention provides an AC-to-DC power supply having a first stage and a second stage. The first stage provides a first DC voltage and the second stage provides a second DC voltage that is less than the first DC voltage. The method provides a blower, and electrically connects the blower to the first stage of the AC-to-DC power supply for the blower to receive the first DC voltage from the AC-to-DC power supply to power the blower.

A blower of an embodiment of the invention includes a motor, an electrical connector, and a number of fan fins. The motor has an electrical connector to connect to a first stage of an AC-to-DC power supply that provides a first DC voltage for the blower to receive the first DC voltage to power the motor. The fan fins are connected to and rotated by the motor. The AC-to-DC power supply further has a second stage that provides a second DC voltage less than the first DC voltage.

BRIEF DESCRIPTION OF SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

Figure 1:
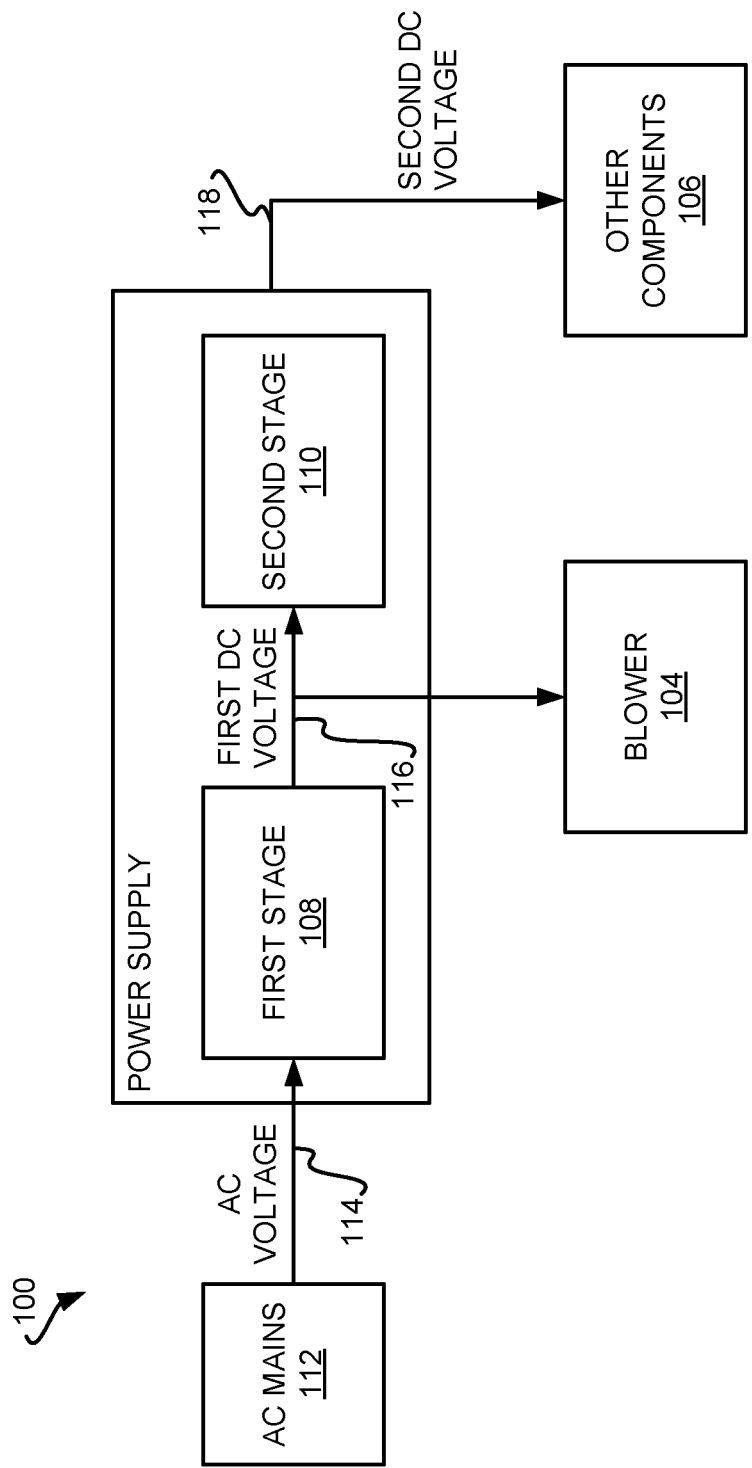
FIG. 1 is a diagram of a system in which a blower is connected to a first stage of a power supply and not to a second stage of the power supply, according to an embodiment of the present invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, computing devices and computing systems typically include blowers to externally exhaust the heat generated by components of the devices and the systems, so that the heat does not result in failure of these components. In general, computing devices and computing systems include power supplies to convert alternating current (AC) power received from AC mains (e.g., by plugging the power supplies into wall outlets) to direct current (DC) power to power the components. The DC voltage provided by such power supplies is typically a relative low voltage, such as 12 volts, as compared to the relatively high AC voltage input into the power supplies, such as 110-120 volts or 205-240 volts. The blowers are conventionally powered by the relatively low DC voltages provided by the power supplies.

In converting AC power to DC power, a power supply has a rated efficiency that is less than 100%. This means that a portion of the AC power that the power supply receives is not used to power components, but rather is dissipated, typically as heat, during conversion into the DC power having a relatively low DC voltage. An efficient power supply may have a rated efficiency of 92%, for example. This means that the power supply dissipates 8% of the power, and such dissipated power is lost, and not used to power the blower and other components. For example, a blower may require 800 watts of power to operate. A power supply having a rated efficiency of 92% dissipates about 70 watts to provide the blower with 800 watts, since 92% of roughly 870 is equal to 800. Therefore, even a relatively efficient power supply having a rated efficiency of 92% loses 70 watts of power to power a blower requiring 800 watts to operate.

The inventor has developed an innovative solution to this problem, so that a power supply does not have to waste as much power to power a blower needing a relatively large number of watts to operate. A power supply may have two stages: a first stage that provides a first DC voltage and a second stage that provides a second DC voltage. The second DC voltage may be 12 volts, such that the blower is conventionally connected to the second stage of the power supply (i.e., the primary output of the power supply) like other components, as described above. However, the first DC voltage may be significantly higher, such as 400 volts. Normally, the blower, or other components, is connected to the second stage of the power supply.

However, the inventor has defied convention in this respect, and has connected the blower to the first stage of the power supply instead of to the second stage of the power supply. As a result, the blower receives the higher first DC voltage, such as 400 volts, instead of the lower second DC voltage, such as 12 volts, from the power supply. The inventor has inventively recognized that the efficiency in providing the higher first DC voltage at the first stage is greater than the efficiency in providing the lower second DC voltage at the second stage of the power supply. Therefore, electrically connecting the blower to the first stage of the power supply instead of to the second stage wastes less power and is more efficient.

For example, the efficiency in providing the higher first DC voltage at the first stage may be 98%, whereas the efficiency in providing the lower second DC voltage at the second stage of the power supply is lower, such as 92%. The efficiency at the second stage of the power supply is lower because the first stage directly connects to the AC mains to generate the first DC voltage from the AC voltage at a first given power loss, and the second stage directly connects to the first stage to generate the second DC voltage from the first DC voltage at a second given power loss. The efficiency at the second stage of the power supply therefore cannot theoretically be any greater than the efficiency at the first stage, and in actuality is lower than the efficiency at the first stage of the power supply, since it encompasses both the first and the second given power losses, plus higher conductor losses due to higher current at lower voltage.

As noted above, electrically connecting an 800-watt blower to a 92% efficient power supply stage means that roughly 70 watts of power are wasted in powering the blower. However, connecting this blower to a 98% efficient power supply stage means that just roughly 16 watts of power are wasted in powering an 800-watt blower, since 98% of roughly 816 are equal to 800. As such, the inventive approach that has been developed can save 870−816=54 watts of power. For an organization having a large number of computing systems that are on all the time, saving 54 watts for each blower means that 473 kilowatt-hours of power are saved for each blower each year, which is a significant cost savings—typically greater on a yearly basis than the cost of the blower itself.

One inventive contribution of the inventor, therefore, is that while power supplies convert an AC voltage to an output DC voltage, like 12 volts, such power supplies may first internally convert the AC voltage to a higher DC voltage, like 400 volts, before converting this higher DC voltage to the output DC voltage. Conventionally, the inner workings of power supplies are ignored when connecting blowers and components of computing devices and computing systems to the power supplies. That is, insofar as a power supply is said to provide a number of given number of watts at 12 volts at a given efficiency, a blower and other components are simply connected to the power supply to receive power at 12 volts from the power supply.

However, the inventor inventively recognized that a power supply may have a number of stages to convert an AC voltage to an output DC voltage, like 12 volts, including an interim or initial stage in which the AC voltage is first converted to a higher DC voltage, like 400 volts. Therefore, the inventor recognized that the higher DC voltage of the interim or initial stage may unconventionally be employed to power a high-wattage blower at a higher efficiency. The higher DC voltage provided at an earlier stage has greater efficiency than the lower DC voltage provided at a later stage of the power supply where the earlier stage is output to the later stage, as described above. Therefore, using the higher DC voltage of the interim or initial stage of the power supply to unconventionally power a high-wattage blower is more efficient than employing the conventional output of the last stage of the power supply to power such a blower.

FIG. 1 shows a system 100, according to an embodiment of the invention. The system 100 includes an AC-to-DC power supply 102, a blower 104, and a number of other components 106. The blower 104 and the components 106 receive power from at least the power supply 102 to operate. The components 106 may include low voltage DC-DC regulators, computing devices, storage devices, and other types of devices and components that need electrical power to operate.

The power supply 102 has a first stage 108 and a second stage 110. The first stage 108 is electrically connected to AC mains 112, such as via a cord plugging into a wall outlet. The AC mains 112 provide an AC voltage 114 to the first stage 108. For example, the AC voltage 114 may be 110-120 volts or 205-240 volts. The first stage 108 converts the AC voltage 114 received from the AC means 112 to a first DC voltage 116, which may be 400 volts. The second stage 110 converts the first DC voltage 116 received from the first stage 108 to a second DC voltage 118, which may be 12 volts.

The blower 104 is electrically connected to the first stage 108, and receives the first DC voltage 116 to power the blower 104. By comparison, the components 106 are electrically connected to the second stage 110, and receive the second DC voltage 118 to power the components 106. Therefore, the blower 104 is powered at a higher DC voltage than the components 106 are, because the first DC voltage 116 is greater than the second DC voltage 118.

The power supply 102 has a first efficiency at converting the AC voltage 114 to the first DC voltage 116 at the first stage 108, and a second efficiency at converting the AC voltage to the second DC voltage 118 at the second stage 110. The second efficiency is less than the first efficiency. This is because the second efficiency encompasses the power losses incurred by both the first stage 108 in converting the AC voltage 114 to the first DC voltage 116 and the power losses incurred by the second stage 118 in converting the first DC voltage 116 to the second DC voltage 118. Therefore, electrically connecting the blower 104 to the first stage 108 instead of to the second stage 110 wastes less power and is more efficient.

Figure 2:
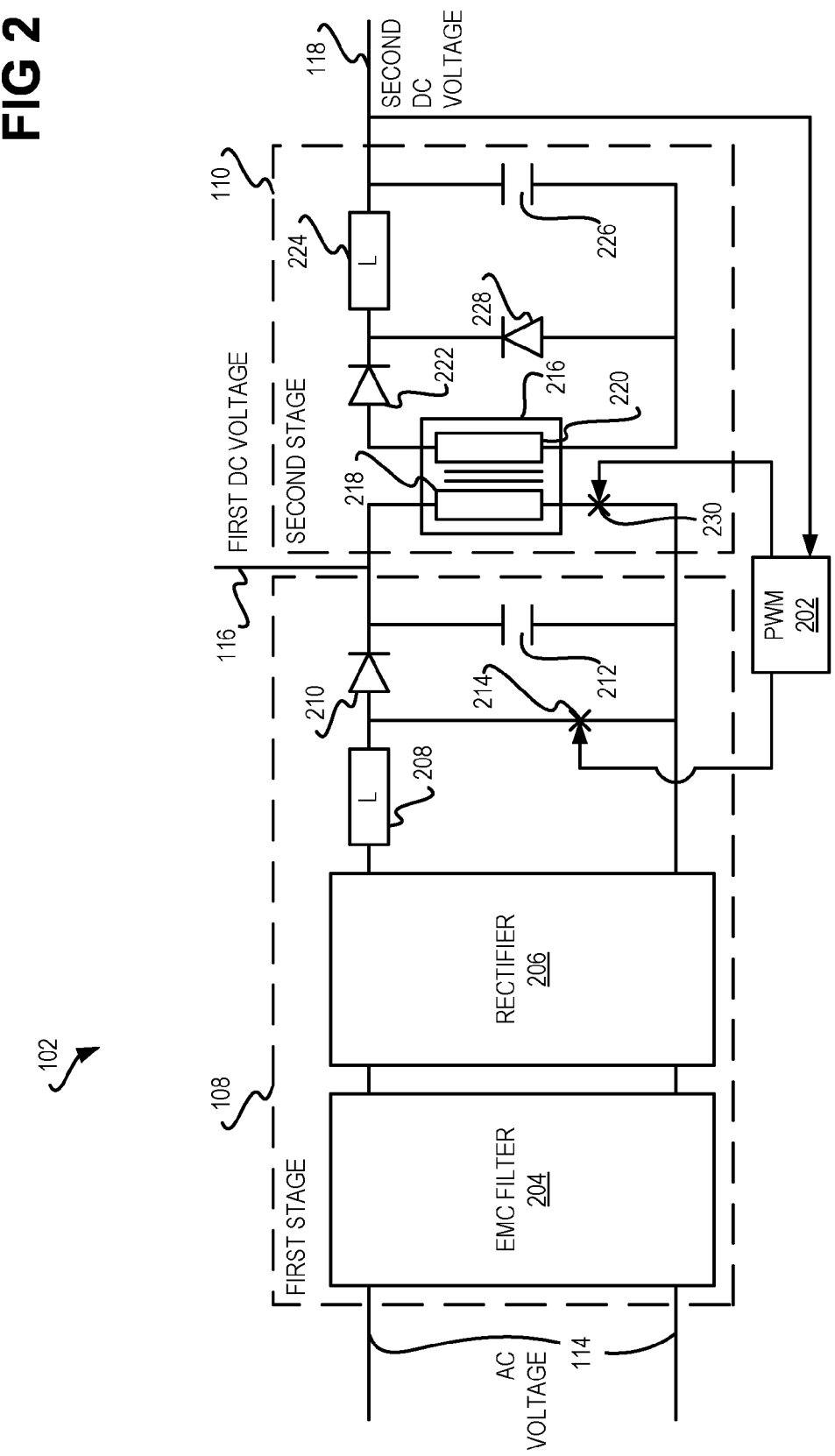
FIG. 2 is a diagram of a power supply, according to an embodiment of the present invention.

FIG. 2 shows the AC-to-DC power supply 102 in more detail, according to an embodiment of the invention. The power supply 102 includes the first stage 108, the second stage 110, as well as a pulse width modulator (PWM) 202. The PWM 202 is depicted in FIG. 2 as being external to the first stage 108 and the second stage 110. However, in other embodiments, the PWM 202 may be part of the first stage 108, or part of the second stage 110. The PWM 202 receives as an input feedback signal the second DC voltage 118. When the second DC voltage 118 is greater than the desired DC voltage to be output by the second stage 110, the PWM 202 outputs a pulse-width modulated control signal at a lower pulse width ratio. When the second DC voltage 118 is lower than the desired DC voltage, the PWM 202 outputs a pulse-width modulated control signal at a higher pulse width ratio.

The first stage 108 converts the AC voltage 114 as input to the first DC voltage 116 as output. An electromagnetic compatibility (EMC) filter 204 filters the AC voltage 114, and a rectifier 206 rectifies the AC voltage 114 after having been filtered. An inductor 208 and a diode 210 are connected in series to an output side of the rectifier 206, and a capacitor 212 is connected between an output of the diode 210 and the rectifier 206. A transistor 214 is connected between the inductor 208 and the diode 210, and is also connected to of the rectifier 206. The transistor 214 is opened and closed in a pulse width modulated manner, by the PWM 202, to provide the first DC voltage 116 between the diode 210 and the capacitor 212.

The second stage 110 converts the first DC voltage 116 as input to the second DC voltage 118 as output. A transformer 216 having a first (input) coil 218 and a second (output) coil 220. The first coil 218 is connected to the output of the first stage 108. A diode 222 and an inductor 224 are connected in series to the second coil 220. A capacitor 226 is connected to the inductor 224 and to the second coil 220. Another diode 228 is connected between the diode 222 and the inductor 224, and is also connected to the second coil 220. A transistor 230 is connected to the first coil 218. Like the transistor 214, the transistor 230 is opened and closed in a pulse width modulated manner, by the PWM 202, to provide the second DC voltage 118 between the inductor 224 and the capacitor 226.

Figure 3:
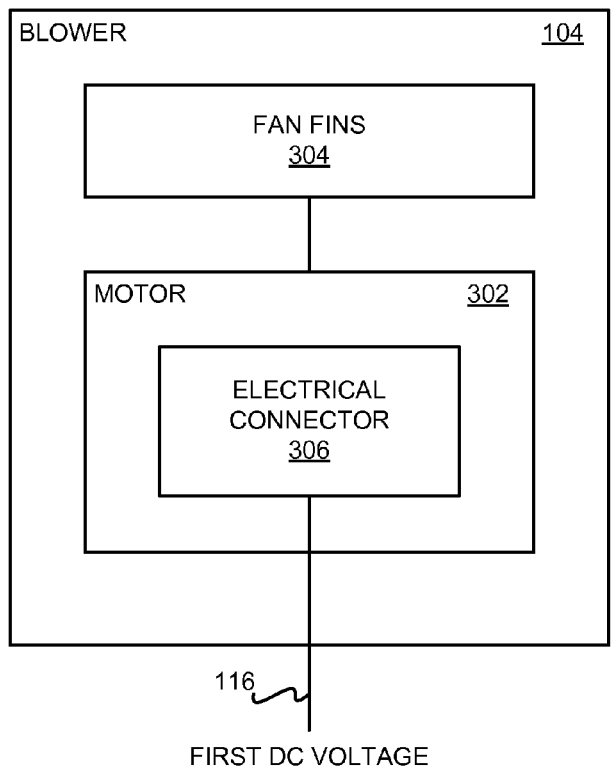
FIG. 3 is a diagram of a blower, according to an embodiment of the present invention.

FIG. 3 shows the blower 104 in more detail, according to an embodiment of the invention. The blower 104 includes a motor 302 and a number of fan fins 304. The fan fins 304 are rotatably connected to the motor 302. Therefore, power being applied to the motor 302 results in the fan fins 304 being rotated. The motor 302 includes an electrical connector 306 to connect to the first stage 108 of the AC-to-DC power supply 102 to receive the first DC voltage 116 from the first stage 108 to power the motor 302 and thus to rotate the fan fins 304.

Figure 4:
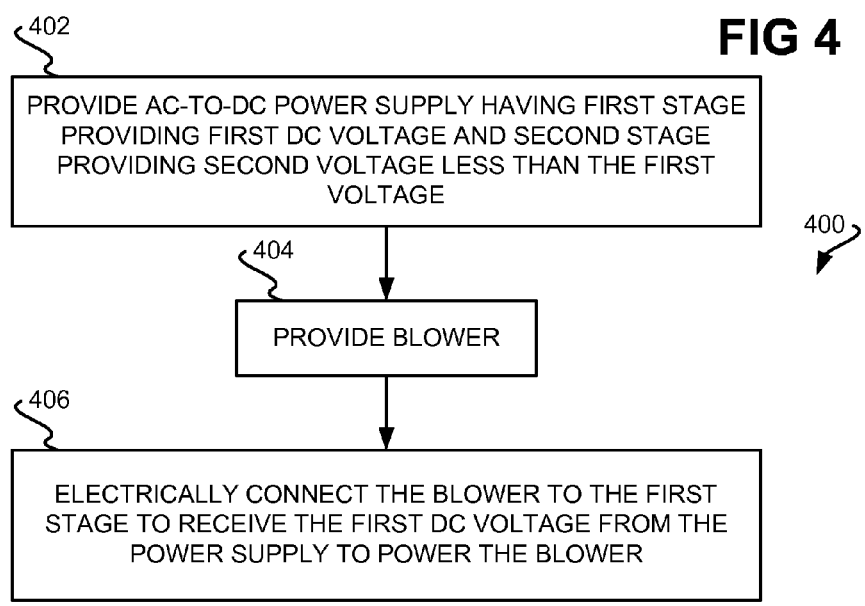
FIG. 4 is a flowchart of a method, according to an embodiment of the present invention.

In conclusion, FIG. 4 shows a method 400, according to an embodiment of the invention. The AC-to-DC power supply 102, having the first stage 108 providing the first DC voltage 116 and the second stage 110 providing the second DC voltage 118, is provided (402). The power supply 102 can include the components that have been described in relation to FIG. 2. The blower 104 is also provided (404). The blower 104 can include the components that have been described in relation to FIG. 3. The blower 104 is electrically connected to the first stage 108 to receive the first DC voltage 116 from the power supply 102 to power the blower 104 (406), instead of being connected to the second stage 110 to receive the second DC voltage 118 from the power supply 102 to power the blower 104.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A system comprising:
    an alternating current-to-direct current (AC-to-DC) power supply having a first stage providing a first DC voltage and a second stage providing a second DC voltage, the second DC voltage less than the first DC voltage; and,
    a blower electrically connected to the first stage of the AC-to-DC power supply to receive the first DC voltage from the AC-to-DC power supply to power the blower,
    wherein the first stage is to be directly connected to an AC signal and is to convert an AC voltage of the AC signal to the first DC voltage,
    wherein the second stage is directly connected to the first stage, is not to be directly connected to the AC signal, and is to convert the first DC voltage to the second DC voltage,
    wherein the AC-to-DC power supply has a first power-conversion efficiency at the first stage and a second power-conversion efficiency at the second stage, the second power-conversion efficiency less than the first power-conversion efficiency, such that electrical connection of the blower to the first stage of the AC-to-DC power supply instead of to the second stage of the AC-to-DC power supply wastes less power and is more efficient,
    wherein the first power-conversion efficiency is defined as a first stage output power that is output by the first stage divided by an input power that is input to the first stage from the AC signal,
    and wherein the second power-conversion efficiency is defined as a second stage output power that is output by the second stage divided by the input power that is input to the first stage from the AC signal.

2. The system of claim 1, wherein the blower comprises:
    a motor having an electrical connector to connect to the first stage of the AC-to-DC power supply; and,
    a plurality of fan fins connected to and rotated by the motor.

3. The system of claim 1, wherein the first stage of the AC-to-DC power supply comprises:
    a rectifier to rectify the AC signal input to the first stage;
    an inductor and a diode connected in series to an output side of the rectifier;
    a capacitor connected between an output of the diode and the rectifier; and,
    a transistor connected between the inductor and the diode and connected to the rectifier,
    wherein the transistor is opened and closed in a pulse width modulated manner to provide the first DC voltage of the first stage between the diode and the capacitor.

4. The system of claim 3, wherein the first stage of the AC-to-DC power supply further comprises an electromagnetic compatibility (EMC) filter between the AC signal and the rectifier.

5. The system of claim 3, wherein the first stage of the AC-to-DC power supply further comprises a pulse width modulator to modulate opening and closing of the transistor.

6. The system of claim 1, wherein the second stage of the AC-to-DC power supply comprises:
    a transformer having a first coil and a second coil, the first coil connected to an output of the first stage of the AC-to-DC power supply;
    an inductor and a first diode connected in series to the second coil;
    a capacitor connected to the inductor and to the second coil;
    a second diode connected between the inductor and the first diode and connected to the second coil; and,
    a transistor connected to the first coil,
    wherein the transistor is opened and closed in a pulse width modulated manner to provide the second DC voltage of the first stage between the inductor and the capacitor.

7. The system of claim 6, wherein the second stage of the AC-to-DC power supply further comprises a pulse width modulator to modulate opening and closing of the transistor.

8. The system of claim 1, wherein the AC-to-DC power supply comprises:
    a first transistor of the first stage;
    a second transistor of the second stage; and,
    a pulse width modulator to modulate the first transistor and the second transistor to provide the first DC voltage at the first stage and to provide the second DC voltage at the second stage.

9. The system of claim 1, wherein the second power-conversion efficiency is necessarily lower than the first power-conversion efficiency, even where identical loads are placed at both the first stage and the second stage, because the second stage directly connects to the first stage such that the second stage encompasses both a first power-conversion energy loss incurred at the first stage and a second power-conversion energy loss incurred at the second stage, while the first stage encompasses just the first power-conversion energy loss.

10. A method comprising:
providing an alternating current-to-direct current (AC-to-DC) power supply having a first stage providing a first DC voltage and a second stage providing a second DC voltage, the second DC voltage less than the first DC voltage;
providing a blower; and,
electrically connecting the blower to the first stage of the AC-to-DC power supply for the blower to receive the first DC voltage from the AC-to-DC power supply to power the blower,
wherein the first stage is to be directly connected to an AC signal and is to convert an AC voltage of the AC signal to the first DC voltage,
wherein the second stage is directly connected to the first stage, is not to be directly connected to the AC signal, and is to convert the first DC voltage to the second DC voltage,
wherein the AC-to-DC power supply has a first power-conversion efficiency at the first stage and a second power-conversion efficiency at the second stage, the second power-conversion efficiency less than the first power-conversion efficiency, such that electrical connection of the blower to the first stage of the AC-to-DC power supply instead of to the second stage of the AC-to-DC power supply wastes less power and is more efficient,
wherein the first power-conversion efficiency is defined as a first stage output power that is output by the first stage divided by an input power that is input to the first stage from the AC signal,
and wherein the second power-conversion efficiency is defined as a second stage output power that is output by the second stage divided by the input power that is input to the first stage from the AC signal.

11. The method of claim 10, wherein providing the blower comprises providing the blower as comprising:
a motor having an electrical connector to connect to the first stage of the AC-to-DC power supply; and,
a plurality of fan fins connected to and rotated by the motor.

12. The method of claim 10, wherein providing the AC-to-DC power supply comprises providing the first stage of the AC-to-DC power supply as comprising:
a rectifier to rectify the AC signal input to the first stage;
an inductor and a diode connected in series to an output side of the rectifier;
a capacitor connected between an output of the diode and the rectifier; and,
a transistor connected between the inductor and the diode and connected to the rectifier,
wherein the transistor is opened and closed in a pulse width modulated manner to provide the first DC voltage of the first stage between the diode and the capacitor.

13. The method of claim 12, wherein providing the AC-to-DC power supply comprises providing the first stage of the AC-to-DC power supply as further comprising an electromagnetic compatibility (EMC) filter between the AC signal and the rectifier.

14. The method of claim 12, wherein providing the AC-to-DC power supply comprises providing the first stage of the AC-to-DC power supply as further a pulse width modulator to modulate opening and closing of the transistor.

15. The method of claim 10, wherein providing the AC-to-DC power supply comprises providing the second stage of the AC-to-DC power supply as comprising:
a transformer having a first coil and a second coil, the first coil connected to an output of the first stage of the AC-to-DC power supply;
an inductor and a first diode connected in series to the second coil;
a capacitor connected to the inductor and to the second coil;
a second diode connected between the inductor and the first diode and connected to the second coil; and,
a transistor connected to the first coil,
wherein the transistor is opened and closed in a pulse width modulated manner to provide the second DC voltage of the first stage between the inductor and the capacitor.

16. The method of claim 15, wherein providing the AC-to-DC power supply comprises providing the second stage of the AC-to-DC power supply as further comprising a pulse width modulator to modulate opening and closing of the transistor.

17. The method of claim 10, wherein providing the AC-to-DC power supply comprises providing the AC-to-DC power supply as comprising:
a first transistor of the first stage;
a second transistor of the second stage; and,
a pulse width modulator to modulate the first transistor and the second transistor to provide the first DC voltage at the first stage and to provide the second DC voltage at the second stage.

18. A blower comprising:
a motor having an electrical connector to connect to a first stage of an alternating current-to-direct current (AC-to-DC) power supply providing a first DC voltage for the blower to receive the first DC voltage to power the motor; and,
a plurality of fan fins connected to and rotated by the motor,
wherein the AC-to-DC power supply further has a second stage providing a second DC voltage less than the first DC voltage,
wherein the first stage is to be directly connected to an AC signal and is to convert an AC voltage of the AC signal to the first DC voltage,
wherein the second stage is directly connected to the first stage, is not to be directly connected to the AC signal, and is to convert the first DC voltage to the second DC voltage,
wherein the AC-to-DC power supply has a first power-conversion efficiency at the first stage and a second power-conversion efficiency at the second stage, the second power-conversion efficiency less than the first power-conversion efficiency, such that electrical connection of the blower to the first stage of the AC-to-DC power supply instead of to the second stage of the AC-to-DC power supply wastes less power and is more efficient,
wherein the first power-conversion efficiency is defined as a first stage output power that is output by the first stage divided by an input power that is input to the first stage from the AC signal,
and wherein the second power-conversion efficiency is defined as a second stage output power that is output by the second stage divided by the input power that is input to the first stage from the AC signal.

* * * * *